July 14, 1931.  J. M. BARR  1,814,424
VARIABLE SPEED MECHANISM
Filed Sept. 6, 1923
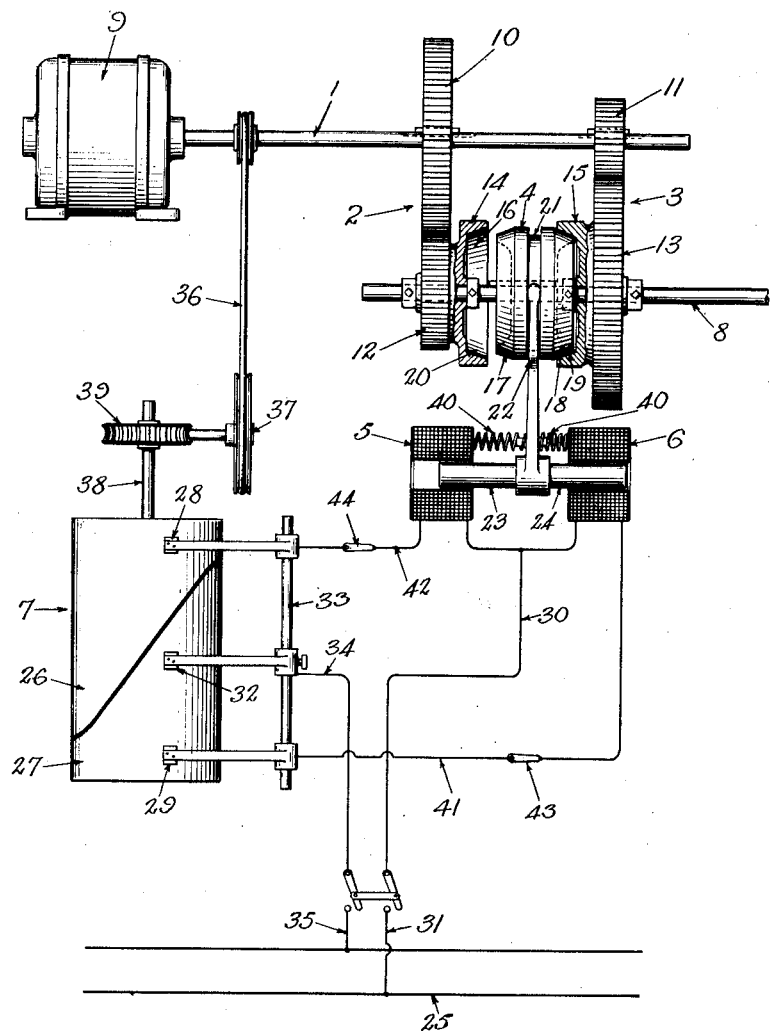
INVENTOR.
John M. Barr
BY
Edwin B. H. Tower, Jr.
ATTORNEY.

Patented July 14, 1931

1,814,424

UNITED STATES PATENT OFFICE

JOHN M. BARR, OF MILWAUKEE, WISCONSIN, ASSIGNOR TO THE LOUIS ALLIS COMPANY, OF MILWAUKEE, WISCONSIN, A CORPORATION OF WISCONSIN

VARIABLE SPEED MECHANISM

Application filed September 6, 1923. Serial No. 661,231.

This invention relates to variable speed mechanisms.

The mechanism to which the invention applies in particular has a driving shaft, a driven shaft, two drives of different ratios for driving the driven shaft from the driving shaft at different speeds, a clutch for connecting the driven shaft to the driving shaft through either of the drives, and means for operating the clutch to vary the speed of the driven shaft.

An object of the invention is to drive a shaft at different speeds for predetermined periods of time to vary the period each speed is maintained.

Another object is to control the speed of a driven shaft by means of an electro-magnetic clutch and to control the clutch by means of a rotary switch.

According to one aspect of the invention, a shaft is driven at different speeds for predetermined periods of time to obtain a substantially constant average speed over a given period, and means are provided for varying the period during which each speed is maintained to thereby vary the average speed.

According to another aspect of the invention, an electromagnetic clutch is employed to connect the driven shaft to the driving shaft through two drives of different ratios alternately, and the electromagnetic clutch is controlled by a rotary switch.

The invention is exemplified in the accompanying drawing in which a variable speed mechanism is shown diagrammatically.

This mechanism comprises, in general, a drive shaft 1, two gear drives 2 and 3 of different ratios, a friction clutch 4, two opposed solenoids 5 and 6 for operating the clutch 4, and a rotary switch 7 for alternately and periodically energizing the windings of the solenoids 5 and 6 to change the speed of a driven shaft 8.

The shaft 1 is driven by a constant speed motor 9 and has two gears 10 and 11 secured thereon to rotate therewith.

The gear 10 meshes with a gear 12 journaled on the driven shaft 8 and the gear 11 meshes with the gear 13, also journaled on the shaft 8.

The gears 12 and 13 are provided on their inner faces with extensions 14 and 15 respectively. Each of these extensions is provided with a conical depression 16.

Intermediate the gears 12 and 13 and splined on the shaft 8 for rotation therewith and longitudinal sliding movement thereon, is the clutch member 4 having conical outer faces 17 and 18 on opposite sides thereof.

The clutch 4 is normally held intermediate the gears 12 and 13 by two opposed springs 40 and when in this position, the shaft 8 is entirely disconnected from the motor shaft.

The springs 40 constitute yieldable means for opposing the engagement of the clutch 4 with the conical faces 19 and 20 of the extensions 15 and 14, respectively.

The clutch 4 when moved to the right engages conical face 19 of the gear 13 to drive the shaft 8 at one speed and when moved to the left engages the conical face 20 of the gear 12 to drive the shaft at another speed.

The faces of the clutch members may be lined with suitable friction material to prevent slippage of the clutch.

The clutch member 4 is moved into engagement with the gears 12 and 13 by the solenoids 5 and 6. For this purpose the clutch member 4 has an annular groove 21 in its outward periphery in which a yoke 22 engages. The yoke 22 is secured intermediate the ends of the plungers 23 and 24 of the solenoids 5 and 6.

The solenoids 5 and 6 are alternately and periodically energized from the line 25 through the rotary switch 7.

The switch 7 comprises a rotatably mounted drum having two insulated contact segments 26 and 27 continuously engaged by stationary brushes 28 and 29 respectively.

Brush 28 is connected to a terminal of the winding of the solenoid 5 and brush 29 to a terminal of the winding of the solenoid 6. The other terminal of each of the solenoid windings is connected by the conductor 30 to current supply lead 31.

The rotary switch is provided with a third brush 32 located between the stationary brushes 28 and 29.

Brush 32 is adjustable longitudinally with respect to the drum on the rod 33 so as to change the duration of the period of energization of the windings of the solenoids 5 and 6.

Adjustable brush 32 is connected by conductor 34 to the supply lead 35.

Solenoid 6 operates when adjustable brush 32 engages contact segment 27, while solenoid 5 operates when brush 32 engages contact segment 26.

Movement of the brush 32 toward either of the stationary brushes 28 or 29 increases the period of energization of the solenoid connected to that brush and decreases the period of energization of the other solenoid.

The drum of the switch 7 is continuously rotated by the motor 9 through suitable driving mechanism, such as a belt 36 connecting the pulleys on the motor shaft 1 and the intermediate shaft 37, the latter being connected to the drum shaft 38 by worm gearing 39.

It will be evident that the rotary switch 7 acts to change the speed of the shaft 8 periodically from that corresponding to the gears 10 and 12, to that corresponding to the gears 11 and 13, and vice versa.

By thus operating the shaft 8 alternately and periodically at different predetermined speeds, a constant average speed intermediate the predetermined speeds is obtained, and by varying the period during which the shaft is operated at each speed, the average speed may be varied.

The controller may, of course, be applied to operate the shaft 8 intermittently at one speed so as to obtain a substantially constant average speed adjustable between zero and the speed of either of the gears 12 and 13.

In such a case, the conductors 41 and 42, connecting the brushes 28 and 29 with the solenoid windings, are provided with manual switches 43 and 44.

If it is desired to operate the motor between zero and a speed corresponding to that of the gear 12, the switch 43 is opened, disconnecting the solenoid 6 from the circuit.

The clutch 4 is then intermittently moved into engagement with the gear 12 by the solenoid 5 and returned to its central position by the opposing springs 40 when solenoid 5 is deenergized.

When it is desired to operate the shaft 8 between zero and the speed corresponding to gear 13, the switch 43 is closed and switch 44 opened.

The invention herein set forth is susceptible of various modifications and adaptations without departing from the scope thereof as hereafter claimed.

The invention is hereby claimed as follows:

1. A periodic change speed drive comprising driving means, driven means, speed controlling means to cause said driving means to drive said driven means at different speeds, means controlling said speed controlling means to cause said driven means to be operated alternately at different speeds for predetermined periods to obtain an intermediate average speed, and means to vary the period each speed is maintained to vary the intermediate average speed.

2. A periodic change speed drive comprising a driver, a driven shaft, driving means connecting said shaft to said driver, electromagnetic means to cause said driving means to drive said shaft periodically at different speeds to obtain a substantially constant average speed intermediate said speeds, and a rotary switch operated in accordance with the speed of said driver to control said electromagnetic means.

3. A periodic change speed drive comprising a driver, a driven shaft, driving means connecting said shaft to said driver, electromagnetic means to cause said driving means to drive said shaft alternately at high and low speeds to obtain an average speed intermediate said speeds, an electric switch controlling said electromagnetic means, and means on said switch to vary the periods during which said shaft is rotated at said high and low speeds.

4. A periodic change speed drive comprising a driver, a driven shaft, driving means connecting said shaft to said driver, electromagnetic means to cause said driving means to drive said shaft periodically at different speeds to obtain a substantially constant average speed intermediate said speeds, and a rotary switch driven by said driver and controlling the electromagnetic means.

5. A periodic change speed drive comprising a driving shaft, a driven shaft, change speed gears connecting said shafts, a friction clutch to change said gears, electromagnetic means to control said clutch, a timed controller to cause said means to operate said clutch periodically to change the speed of said second shaft and thereby obtain a constant average speed over any given period, and means to vary the periodicity of the controller.

6. A periodic change speed drive comprising a driving shaft, a driven shaft, a variable speed drive connecting said shafts, a clutch to actuate said drive, electromagnetic means to operate said clutch, a controller for said electromagnetic means for actuating said clutch periodically to vary the speed of the driven shaft and thereby obtain a uniform average speed of said driven shaft over any given period, and means for varying the periodicity of said controller.

7. A periodic change speed drive comprising a driving shaft, a driven shaft, a variable speed drive connecting said shafts, a clutch to actuate said drive, electromagnetic means to operate said clutch, and a controller for said electromagnetic means for actuating said clutch periodically to vary the speed of the driven shaft and thereby obtain a uniform average speed of said driven shaft over any given period, said controller being driven in accordance with the speed of the driving shaft.

8. A periodic change speed drive comprising a driving shaft, a driven shaft, change speed gears connecting said shafts, a clutch controlling said gears, electromagnetic means to operate said clutch periodically and cause said driven shaft to be operated alternately at different speeds for predetermined periods of time to obtain a substantially constant average speed intermediate said speeds, and means to vary the period each speed is maintained to vary said intermediate average speed.

9. A periodic change speed drive comprising a driving shaft, a driven shaft, change speed gears connecting said shafts, a clutch controlling said gears, electromagnetic means to operate said clutch periodically and cause said driven shaft to be operated alternately at different speeds for predetermined periods of time to obtain a substantially constant average speed intermediate said speeds, a controller for said electromagnetic means operated in accordance with the speed of said driving shaft, and means to vary the period each speed is maintained to vary said intermediate average speed.

In witness whereof, I have hereunto subscribed my name.

JOHN M. BARR.